C. C. SANDERS.
DEMOUNTABLE RIM.
APPLICATION FILED JULY 10, 1917.
1,263,121.
Patented Apr. 16, 1918.
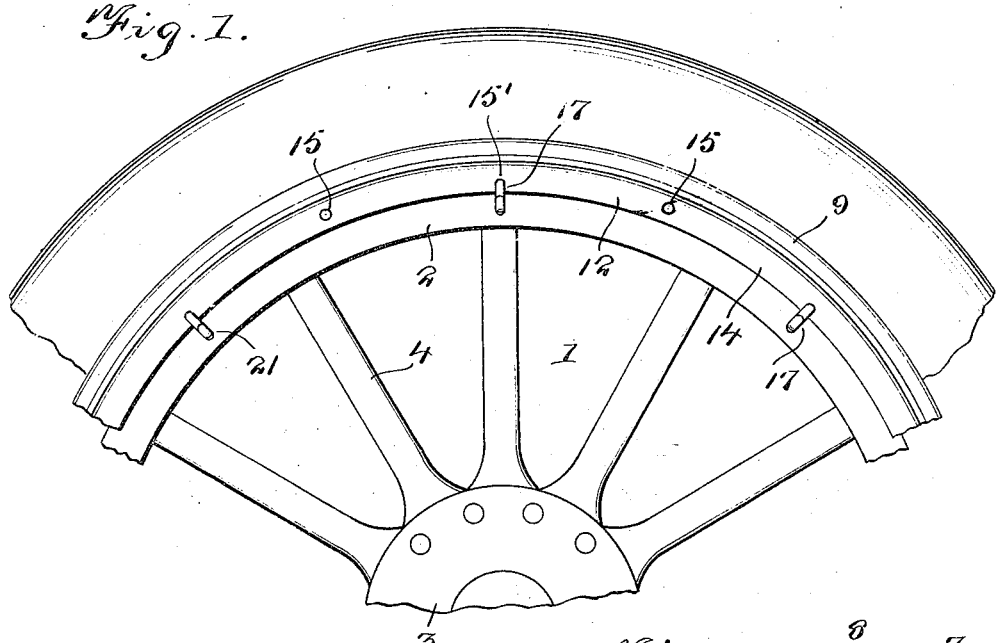
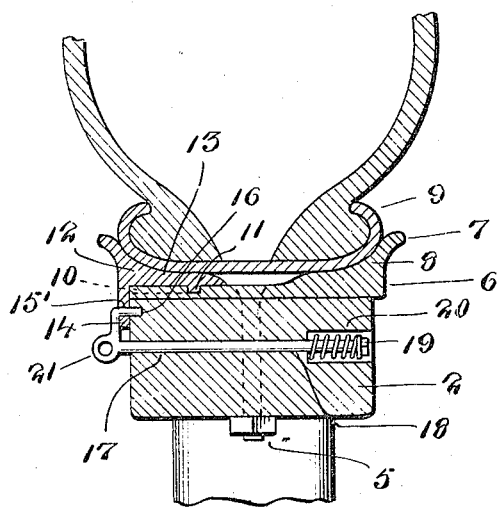
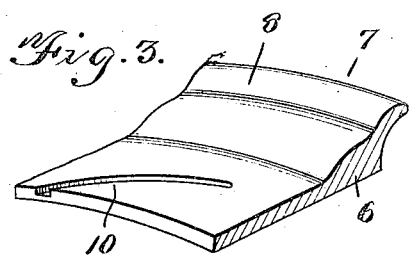
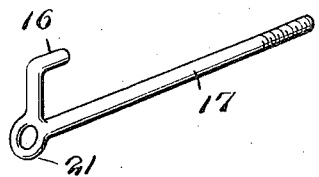
WITNESSES
INVENTOR
C. C. Sanders
BY Victor J. Evans
ATTORNEY

UNITED STATES PATENT OFFICE.

CARROLL C. SANDERS, OF GRANT, OKLAHOMA.

DEMOUNTABLE RIM.

1,263,121.　　　　　Specification of Letters Patent.　　Patented Apr. 16, 1918.

Application filed July 10, 1917. Serial No. 179,727.

*To all whom it may concern:*

Be it known that I, CARROLL C. SANDERS, a citizen of the United States, residing at Grant, in the county of Choctaw and State of Oklahoma, have invented new and useful Improvements in Demountable Rims, of which the following is a specification.

This invention relates to improvements in demountable rims for automobile wheels and contemplates in particular the provision of a rim having a locking ring establishing connection with the rim through a bayonet joint connection and means for locking the ring in position.

One form of the invention is illustrated in the accompanying drawings described in the specification below and the novel features are broadly set forth in the claims.

In the drawings:

Figure 1 represents a fragmentary side elevation of an automobile wheel having the rim comprising the present invention applied thereto and showing a tire in position on the rim, Fig. 2 is a transverse sectional view of the same, Fig. 3 is a fragmentary perspective view illustrating in detail bayonet joint connections between the locking ring and the inner rim, Fig. 4 shows the locking pin in detail.

In the drawings I have designated by the numeral 1 an automobile wheel which may be of any customary construction and in the present instance has a wooden felly 2 connected to a hub 3 by spokes 4. Suitably secured on the felly by bolts 5 or in any other acceptable manner is a metallic rim 6 having adjacent one edge a radially disposed flange or shoulder 7 which may have the inner face beveled or sloping as shown at 8 for receiving one side of the usual outer tire-holding rim 9. The inner rim 6 is provided in periphery toward the other edge with a plurality of spiral channels or grooves 10 adapted to receiving lugs 11 on the locking ring 12 whereby a wedge shaped shoulder 13 may be engaged under and against the rim 9 to securely clamp the latter in position. The locking ring 12 is further provided with an inwardly extending radial flange 14 adapted to cover the ends of the grooves 10 to prevent entrance of dirt. The flange 14 may be formed when desired with a plurality of recesses or openings 15 for engagement by a suitable tool whereby the ring may be tightly screwed in position or unscrewed. For retaining the ring 12 in the operative position it is provided in the lateral outer surface with a plurality of recesses 15' adapted for receiving the inwardly bent end 16 of a locking pin 17 slidably and rotatably inserted in an opening 18 wherewith the felly is formed transversely. The other end of the pin 17 is provided with a head 19 which may be screw threaded or otherwise detachably secured on the pin and the adjacent end of the opening 18 is suitably counter-bored for receiving a compression spring 20 bearing against the bottom of the counter-bore and the head 19 to maintain the bent end 16 of the pin 17 in the engaged position. Suitable means shown as a ring 21 constituting an integral part of the bent end of the pin are provided whereby the pin may be manually moved longitudinally to disengage the pin end 16 from the recess 15 and may be rotated to remove the bent end out of the path of the ring to permit removing the ring.

The herein described embodiment of the invention while constituting the form which is believed to be preferable represents only one of many possible modifications of the invention and the right is reserved to all such variations and departures therefrom as fall within the scope of the invention as indicated by the latitude of the claims.

What I claim is:—

1. In a demountable rim structure for vehicle wheels, the combination of the felly formed with an opening, the shouldered inner rim on the felly, the outer rim detachably mounted on the inner rim, the locking ring adapted for bayonet joint connection to the inner rim and provided in the laterally outer surface with recesses, and the spring pressed locking pin slidably mounted in the opening of the felly and provided with a hooked end for engaging in the recesses of said locking ring.

2. In a demountable rim structure for vehicle wheels, a felly formed transversely with a counter-bored opening, a shouldered inner rim on the felly, said rim formed with bayonet grooves, an outer rim loosely mounted on the inner rim, a locking ring provided with lugs for engaging in the bayonet grooves of the inner rim and provided in the laterally outer surface with a plurality of recesses, said ring having a shoulder adapted for clamping said outer rim against said shoulder of the inner rim, a headed pin loosely inserted in said opening of the felly, a spring in the counter-bore of said opening and bearing against the head of the pin, said pin formed at the other end with the bent portion for engaging in said recesses of the ring to prevent rotative movement of the rim, the last mentioned end of the pin having a portion adapted to be manually grasped, whereby the pin may be longitudinally actuated to disengage said bent portion from the ring, and whereby the pin may be rotated to dispose said bent portion out of the way of the ring to permit removing the ring.

In testimony whereof I affix my signature.

CARROLL C. SANDERS.